United States Patent
Tan et al.

(10) Patent No.: US 11,955,883 B2
(45) Date of Patent: Apr. 9, 2024

(54) MAGNETIC APPARATUS AND TWO-WAY DC CONVERTER CIRCUIT

(71) Applicant: Huawei Technologies Co., Ltd., Shenzhen (CN)

(72) Inventors: Wei Tan, Vienna (AT); Peng Yu, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 222 days.

(21) Appl. No.: 17/692,623

(22) Filed: Mar. 11, 2022

(65) Prior Publication Data

US 2022/0200446 A1 Jun. 23, 2022

Related U.S. Application Data

(63) Continuation of application No. PCT/CN2020/092108, filed on May 25, 2020.

(30) Foreign Application Priority Data

Sep. 11, 2019 (CN) .......................... 201910860111.2

(51) Int. Cl.
*H02M 3/00* (2006.01)
*H02M 1/00* (2006.01)
*H01F 27/30* (2006.01)

(52) U.S. Cl.
CPC ........... *H02M 3/01* (2021.05); *H02M 1/0048* (2021.05); *H01F 27/306* (2013.01); *H02M 1/0064* (2021.05)

(58) Field of Classification Search
CPC ........ H01F 27/306; H01F 27/24; H02M 3/01; H02M 1/0048
See application file for complete search history.

(56) References Cited

U.S. PATENT DOCUMENTS

| 8,058,962 B2 | 11/2011 | Zeng et al. |
| 8,169,796 B2 * | 5/2012 | Hosotani ................. H01F 27/38 363/17 |

(Continued)

FOREIGN PATENT DOCUMENTS

| CN | 201311808 Y | 9/2009 |
| CN | 103762846 A | 4/2014 |

(Continued)

OTHER PUBLICATIONS

Deng, Kang., et al, "A zero voltage switching push-pull circuit with integrated magnetic structure," 2019, 7 pages.

(Continued)

*Primary Examiner* — Adolf D Berhane
*Assistant Examiner* — Afework S Demisse
(74) *Attorney, Agent, or Firm* — Conley Rose, P.C.

(57) ABSTRACT

A magnetic apparatus includes a first magnetic member, a second magnetic member, a first winding, and a second winding, where the first magnetic member includes a first magnetic cylinder, a second magnetic cylinder, a third magnetic cylinder, and at least one fourth magnetic cylinder, and where the first winding is wound around the first magnetic cylinder and the second magnetic cylinder, the second winding is wound around the first magnetic cylinder and the third magnetic cylinder, and a direction in which the first winding is wound around the second magnetic cylinder is opposite to a direction in which the second winding is wound around the third magnetic cylinder.

20 Claims, 12 Drawing Sheets

(56) References Cited

U.S. PATENT DOCUMENTS

2018/0034360 A1     2/2018   Hirabayashi
2020/0027642 A1*   1/2020   Tsai ........................ H01F 27/40

FOREIGN PATENT DOCUMENTS

| CN | 205104331 U | 3/2016 |
| CN | 105810406 A | 7/2016 |
| CN | 107666247 A | 2/2018 |
| CN | 107888074 A | 4/2018 |
| CN | 207321121 U | 5/2018 |
| CN | 108109821 A | 6/2018 |
| CN | 108988645 A | 12/2018 |
| CN | 208622565 U | 3/2019 |
| CN | 209312558 U | 8/2019 |
| CN | 110729903 A | 1/2020 |
| JP | H06215962 A | 8/1994 |
| JP | 2014063856 A | 4/2014 |

OTHER PUBLICATIONS

Haoyu Wang et al, "Transportation Electrification: Conductive charging of electrified vehicles," IEEE Electrification Magazine, vol. 1, Issue: 2, Dec. 2013, 13 pages.

\* cited by examiner

MAGNETIC APPARATUS AND TWO-WAY DC CONVERTER CIRCUIT

CROSS-REFERENCE TO RELATED APPLICATIONS

This is a continuation of International Patent Application No. PCT/CN2020/092108 filed on May 25, 2020, which claims priority to Chinese Patent Application No. 201910860111.2 filed on Sep. 11, 2019. The disclosures of the aforementioned applications are hereby incorporated by reference in their entireties.

TECHNICAL FIELD

This application relates to the field of electronic technologies, and in particular, to a magnetic apparatus and a two-way direct current (DC) converter circuit.

BACKGROUND

Compared with a one-way DC converter circuit, a two-way DC converter circuit may implement a two-way DC conversion, and therefore is increasingly widely used in two-way power conversion scenarios. With gradual popularization of new energy vehicles, a mainstream topology structure of an on-board charger (OBC) circuit has evolved from a single-resonant-inductor resonant topology to a primary side-secondary side dual-resonant-inductor resonant topology, and a two-way DC converter circuit has become an integral part of the primary side-secondary side dual-resonant-inductor resonant topology.

For example, FIG. 1 is a schematic diagram of an OBC two-way circuit system based on the primary side-secondary side dual-resonant-inductor resonant topology. In a forward charging process, mains electricity (two-phase or three-phase) 15 passes through a power factor correction (PFC) circuit 12 and a two-way DC converter circuit 13, and high-voltage power is obtained. This high-voltage power charges an in-vehicle high-voltage traction battery 14, and also charges an in-vehicle low-voltage battery 17 through a one-way DC converter circuit 16. In a reverse in-vehicle alternating current (AC) power supply process, the in-vehicle high-voltage traction battery 14 outputs high-voltage power, and the high-voltage power, after passing through the two-way DC converter circuit 13 and the PFC 12, is used to supply power to an AC load connected to an in-vehicle AC power supply circuit 11. In addition, the high-voltage power output by the in-vehicle high-voltage traction battery 14 may also be used to supply power to an in-vehicle low-voltage battery 17 through the one-way DC converter circuit 16.

In other approaches, a two-way dual-resonant inductor magnetic member in the two-way DC converter circuit is shown as A in FIG. 2, and a one-way single-resonant inductor magnetic member in the one-way DC converter circuit 16 is shown as B in FIG. 2. It can be seen from the figure that a resonant inductor winding and a transformer winding are wound separately, with no electrical connection therebetween, and are both wound on a same magnetic cylinder. As the windings are separately wound and are not electrically connected to each other, no interleaving cancellation effect exists between the windings, and a skin effect of the windings is large, resulting in high winding losses, and the losses increase with a frequency index. This is not conducive to high frequency development.

SUMMARY

Embodiments of this application provide a magnetic apparatus and a two-way DC converter circuit, to reduce losses in windings of the magnetic apparatus.

To achieve the foregoing objective, the following technical solutions are used in the embodiments of this application.

According to a first aspect, a magnetic apparatus is provided, including a first magnetic member, a second magnetic member, a first winding, and a second winding, where the first magnetic member includes a first magnetic cylinder, a second magnetic cylinder, a third magnetic cylinder, and at least one fourth magnetic cylinder, the first winding is wound around the first magnetic cylinder and the second magnetic cylinder, the second winding is wound around the first magnetic cylinder and the third magnetic cylinder, and a direction in which the first winding is wound around the second magnetic cylinder is opposite to a direction in which the second winding around the third magnetic cylinder, the first magnetic member and the second magnetic member form a magnetic circuit of a transformer through the first magnetic cylinder and the fourth magnetic cylinder, a part of the first winding around the second magnetic cylinder forms a primary side resonant inductor, and a part of the second winding around the third magnetic cylinder forms a secondary side resonant inductor.

In the magnetic apparatus provided in the embodiments of this application, a primary side coil (that is, a part of the first winding around the first magnetic cylinder) of the transformer of the two-way DC converter circuit is connected to the primary side resonant inductor (that is, the part of the first winding around the second magnetic cylinder) in series (in a form of the first winding), and a first secondary side coil (that is, a part of the second winding around the first magnetic cylinder) of the transformer is connected to the secondary side resonant inductor (that is, the part of the second winding around the third magnetic cylinder) in series (in a form of the second winding), thereby resolving a problem of high losses in the other approaches due to no electrical connection between the windings and therefore no interleaving cancellation effect, and reducing losses of the winding in the magnetic apparatus. A winding path can be reduced by more than 30 percent (%), and winding losses can be reduced by more than 30%. In addition, relatively discrete magnetic members are used, and the resonant inductor and the transformer are integrated, and therefore a quantity of magnetic members and a quantity of assembly procedures are reduced. In addition, the direction in which the first winding is wound around the second magnetic cylinder is opposite to the direction in which the second winding is wound around the third magnetic cylinder, so that in the magnetic circuit, a direction of magnetic flux generated by the primary side resonant inductor is opposite to a direction of magnetic flux generated by the secondary side resonant inductor.

A direction in which the first winding is wound around the first magnetic cylinder and a direction in which the second winding is wound around the first magnetic cylinder may be the same or opposite. When the winding directions are the same, an in-phase end of a primary side and an in-phase end of a secondary side of the transformer are opposite, and when the winding directions are opposite, the in-phase end of the primary side and the in-phase end of the secondary side of the transformer are the same.

In a possible implementation, the second magnetic member is a magnetic member without a magnetic cylinder, and a surface of the second magnetic member is coupled to all the magnetic cylinders of the first magnetic member.

In a possible implementation, the second magnetic member is a magnetic member with a magnetic cylinder, and a magnetic cylinder the second magnetic member is placed opposite to and coupled to a magnetic cylinder of the first magnetic member at a same position.

In a possible implementation, the second magnetic member may be a magnetic member the same as the first magnetic member. This can reduce types of molds for producing hardware, thereby reducing assembly difficulty.

In a possible implementation, the first magnetic member further includes a fifth magnetic cylinder and a sixth magnetic cylinder, the first winding is further wound around the fourth magnetic cylinder and the fifth magnetic cylinder, a direction in which the first winding is wound around the fifth magnetic cylinder is opposite to the direction in which the first winding is wound around the second magnetic cylinder, and a direction in which the first winding is wound around the fourth magnetic cylinder is opposite to the direction in which the first winding is wound around the first magnetic cylinder, parts of the first winding around the second magnetic cylinder and the fifth magnetic cylinder form the primary side resonant inductor, the second winding is further wound around the fourth magnetic cylinder and the sixth magnetic cylinder, a direction in which the second winding is wound around the sixth magnetic cylinder is opposite to the direction in which the second winding is wound around the third magnetic cylinder, and a direction in which the second winding is wound around the fourth magnetic cylinder is opposite to the direction in which the second winding is wound around the first magnetic cylinder, and parts of the second winding around the third magnetic cylinder and the sixth magnetic cylinder form the secondary side resonant inductor. The direction of the magnetic flux generated by the primary side resonant inductor may be made opposite to the direction of the magnetic flux generated by the secondary side resonant inductor. The magnetic circuit refers to a closed path through which the magnetic flux passes.

In a possible implementation, a width of an air gap between the fourth magnetic cylinder and the second magnetic member is equal to a width of an air gap between the first magnetic cylinder and the second magnetic member. On the one hand, by adjusting the widths of the foregoing air gaps, magnetic resistance of the magnetic circuit (a magnetic specification of the magnetic circuit) may be adjusted to implement an optimal working state of the circuit. On the other hand, the first magnetic cylinder and the fourth magnetic cylinder serve as a magnetic core of the transformer, and the width of the air gap between the first magnetic cylinder and the second magnetic member is equal to the width of the air gap between the fourth magnetic cylinder and the second magnetic member. In other words, widths of air gaps of the transformer are the same, which may balance magnetic resistance of the magnetic circuit of the transformer symmetrically.

In a possible implementation, a width of an air gap between the second magnetic cylinder and the second magnetic member is equal to a width of an air gap between the fifth magnetic cylinder and the second magnetic member, and a width of an air gap between the third magnetic cylinder and the second magnetic member is equal to a width of an air gap between the sixth magnetic cylinder and the second magnetic member. On the one hand, by adjusting the widths of the foregoing air gaps, magnetic resistance of the magnetic circuit (a magnetic specification of the magnetic circuit) may be adjusted to implement an optimal working state of the circuit. On the other hand, the parts of the first winding around the second magnetic cylinder and the fifth magnetic cylinder serve as the primary side resonant inductor, and the width of the air gap between the second magnetic cylinder and the second magnetic member is equal to the width of the air gap between the fifth magnetic cylinder and the second magnetic member, in other words, widths of air gaps of the primary side resonant inductor are the same, which may balance magnetic resistance of the magnetic circuit of the primary side resonant inductor symmetrically. Parts of the second winding around the third magnetic cylinder and the sixth magnetic cylinder serve as the secondary side resonant inductor, and the width of the air gap between the third magnetic cylinder and the second magnetic member is equal to the width of the air gap between the six magnetic cylinders and the second magnetic member, in other words, widths of air gaps of the secondary side resonant inductor are the same, which may balance magnetic resistance of the magnetic circuit of the secondary side resonant inductor symmetrically.

In a possible implementation, the widths of the air gaps of the primary side resonant inductor may be the same as or different from the widths of the air gaps of the secondary side resonant inductor.

In a possible implementation, the magnetic apparatus further includes at least one third winding, where the third winding is wound around the fourth magnetic cylinder, and a part of the third winding around the fourth magnetic cylinder forms a second secondary side coil. One-side output of the second secondary side coil is implemented.

In a possible implementation, the magnetic apparatus further includes at least one fourth winding, where the fourth winding is wound around the first magnetic cylinder, and a part of the fourth winding around the first magnetic cylinder forms a second secondary side coil. The second secondary side coil formed by the third winding and the second secondary side coil formed by the fourth winding may be connected in parallel to a secondary side switch circuit, thereby implementing two-side output of the second secondary side coil.

In a possible implementation, the width of the air gap between the second magnetic cylinder and the second magnetic member and the width of the air gap between the third magnetic cylinder and the second magnetic member are greater than or equal to the width of the air gap between the first magnetic cylinder and the second magnetic member, and the width of the air gap between the first magnetic cylinder and the second magnetic member is greater than zero.

According to a second aspect, a two-way DC converter circuit is provided, including a primary side resonant switch circuit, a secondary side resonant switch circuit, and the magnetic apparatus according to any one of the first aspect or the implementations thereof, where the primary side resonant switch circuit is connected to a primary side resonant inductor of the magnetic apparatus, and the secondary side resonant switch circuit is connected to a secondary side resonant inductor of the magnetic apparatus.

In a possible implementation, the two-way DC converter circuit further includes a secondary side switch circuit, where the secondary side switch circuit is connected to a second secondary side coil of the magnetic apparatus.

Refer to any one of the first aspect or implementations thereof for technical effects of the second aspect.

DESCRIPTION OF EMBODIMENTS

A magnetic apparatus and a two-way DC converter circuit provided in the embodiments of this application can be applied to a two-way power conversion scenario. Applying the two-way DC converter circuit to an OBC circuit system is used as an example for description in this application, but is not intended to be limited thereto.

Figure 1:
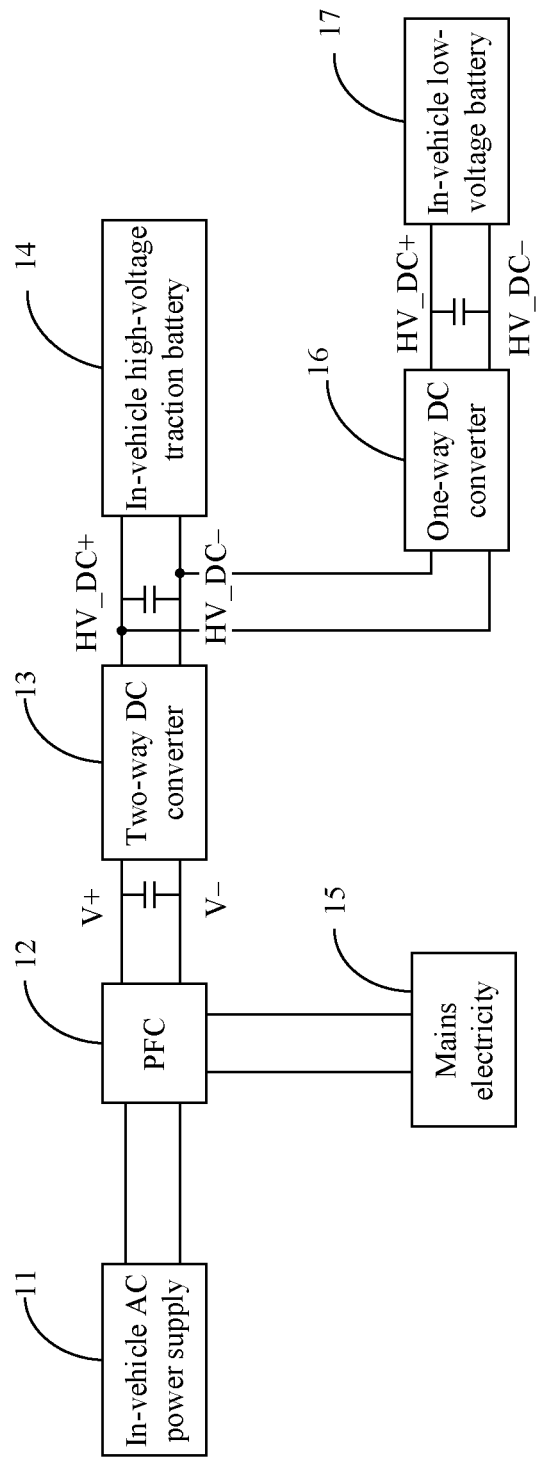
FIG. 1 is a schematic structural diagram of an OBC two-way circuit system according to an embodiment of this application.
Figure 2:
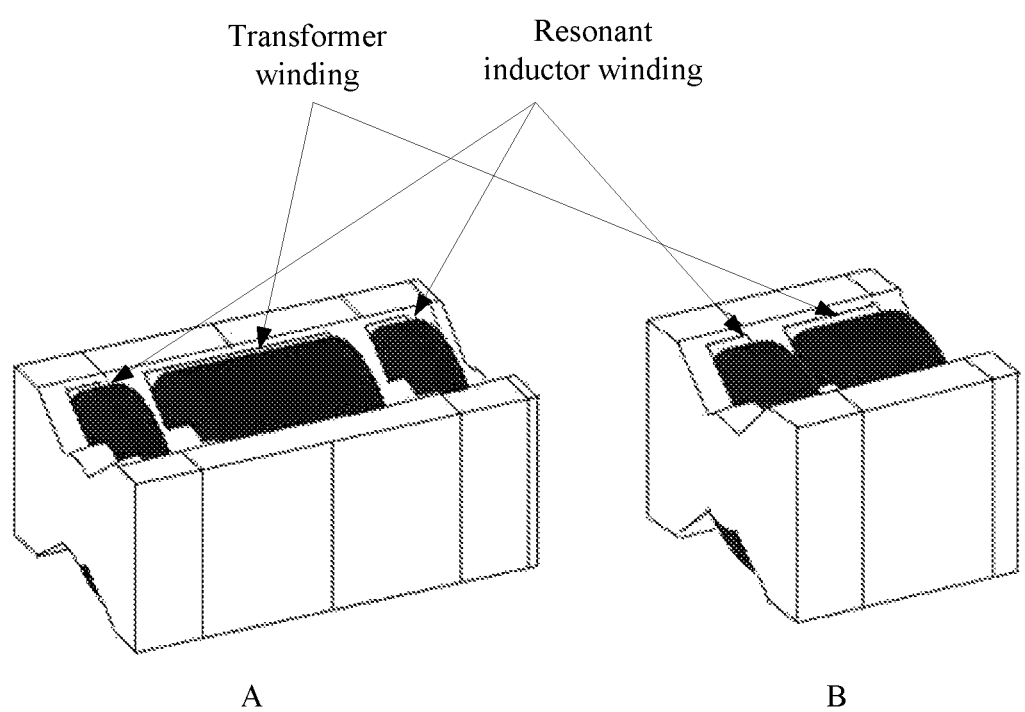
FIG. 2 is a schematic structural diagram of a two-way dual-resonant-inductor magnetic member and a one-way single-resonant-inductor magnetic member in a two-way DC converter circuit according to an embodiment of this application.
Figure 3:
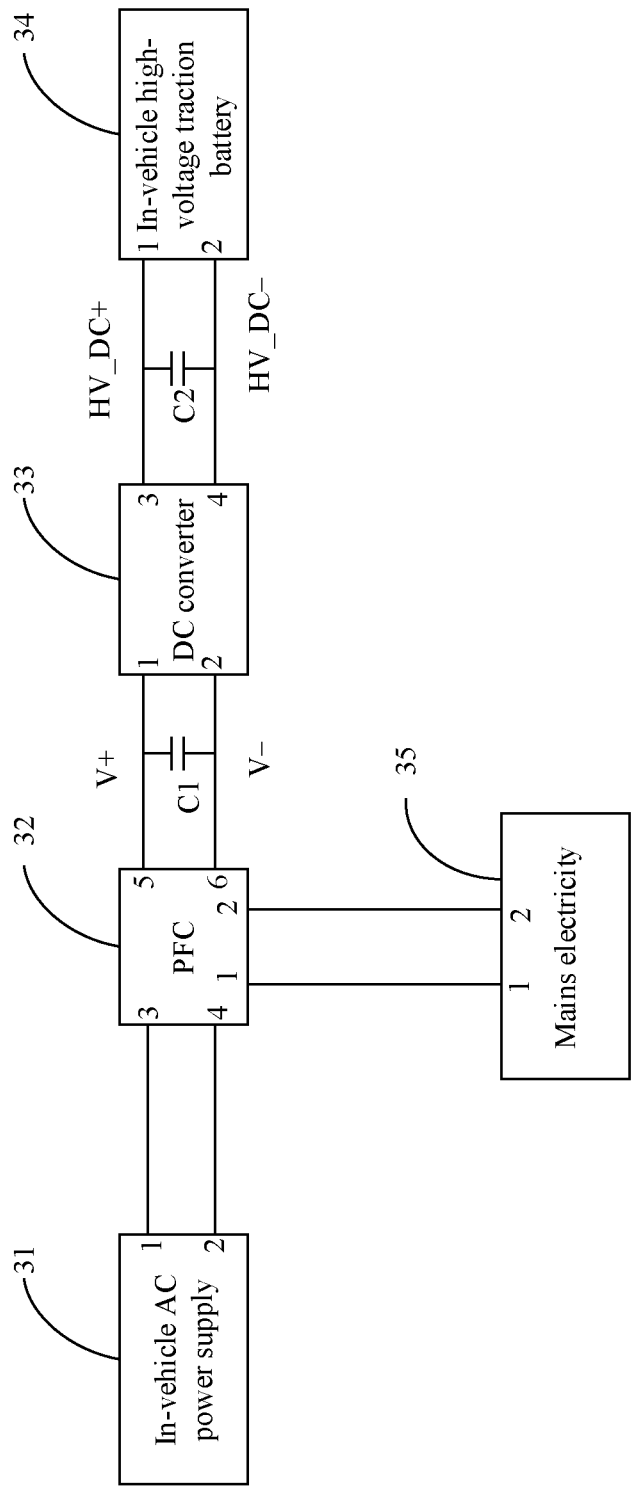
FIG. 3 is a schematic structural diagram of an OBC circuit according to an embodiment of this application.

For example, an embodiment of this application provides an OBC circuit system. When the OBC circuit system is an OBC two-way circuit system, as shown in FIG. 3, the OBC circuit system may include an in-vehicle AC power supply circuit 31, a PFC circuit 32, a two-way DC converter circuit 33, an in-vehicle high-voltage traction battery 34, mains electricity 35, a first capacitor C1, and a second capacitor C2.

A first terminal of the mains electricity 35 is connected to a first terminal of the PFC circuit 32, and a second terminal of the mains electricity 35 is connected to a second terminal of the PFC circuit 32. A third terminal of the PFC circuit 32 is connected to a first terminal of the in-vehicle AC power supply circuit 31, and a fourth terminal of the PFC circuit 32 is connected to a second terminal of the in-vehicle AC power supply circuit 31. A fifth terminal of the PFC circuit 32 is connected to a first terminal of the two-way DC converter circuit 33 and a first terminal of the first capacitor C1, and a sixth terminal of the PFC circuit 32 is connected to a second terminal of the two-way DC converter circuit 33 and the first terminal of the first capacitor C1. A third terminal of the two-way DC converter circuit 33 is connected to a first terminal of the in-vehicle high-voltage traction battery 34 and a first terminal of the second capacitor C2, and a fourth terminal of the two-way DC converter circuit 33 is connected to a second terminal of the in-vehicle high-voltage traction battery 34 and a second terminal of the second capacitor C2.

Figure 4:
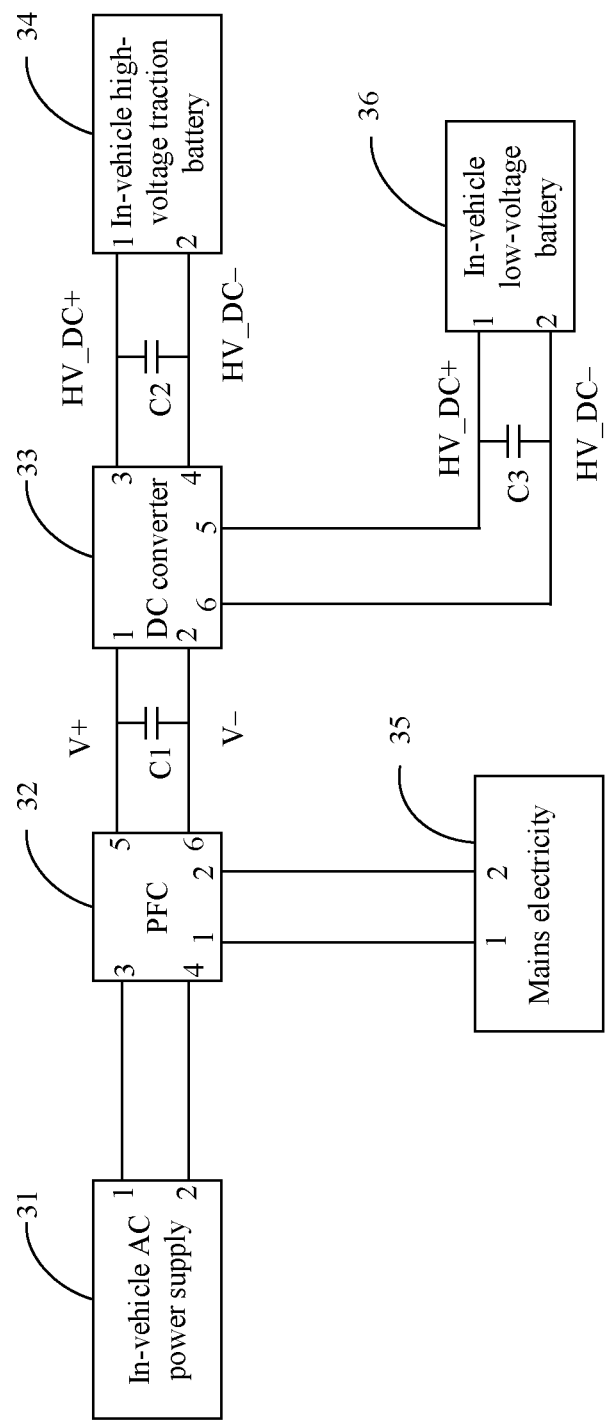
FIG. 4 is a schematic structural diagram of another OBC circuit according to an embodiment of this application.

Optionally, when the OBC circuit system is an OBC three-way circuit system, as shown in FIG. 4, the OBC circuit system may further include an in-vehicle low-voltage battery 36 and a third capacitor C3.

A fifth terminal of the two-way DC converter circuit 33 is connected to a first terminal of the in-vehicle low-voltage battery 36 and a first terminal of the third capacitor C3, and a sixth terminal of the two-way DC converter circuit 33 is connected to a second terminal of the in-vehicle low-voltage battery 36 and a second terminal of the third capacitor C3

The in-vehicle AC power supply circuit 31 may be configured to supply power to a connected AC load.

A power factor is a ratio of an active power (P) to an apparent power (S), and the PFC circuit 32 is configured to adjust the power factor to improve power utilization.

The in-vehicle high-voltage traction battery 34 may be configured to supply power to a motor during traveling of the vehicle.

The in-vehicle low-voltage battery 36 may be configured to supply power to an in-vehicle device, such as an in-vehicle computer.

The first capacitor C1, the second capacitor C2, and the third capacitor C3 are configured for filtering.

When the OBC circuit system is an OBC two-way circuit system, the two-way DC converter circuit 33 may perform two-way voltage conversion on direct current between the in-vehicle AC power supply circuit 31 and the in-vehicle high-voltage traction battery 34. When the OBC circuit system is an OBC three-way circuit system, the two-way DC converter circuit 33 may further supply power to the in-vehicle low-voltage battery 36.

A working process of the OBC circuit system is described below by using the OBC three-way circuit system shown in FIG. 4 as an example. In a forward charging process, the mains electricity (two-phase or three-phase) 35 passes through the PFC circuit 32 and the two-way DC converter circuit 33, high-voltage power is obtained and used to charge the in-vehicle high-voltage traction battery 34, and low-voltage power is also obtained and used to charge the in-vehicle low-voltage battery 36. In a reverse power supply process, the in-vehicle high-voltage traction battery 34 outputs high-voltage power. The high-voltage power passes through the two-way DC converter circuit 33, an in-vehicle power supply 31 is obtained through the PFC circuit 32 and may be used to supply power to a load that needs AC power, and low-voltage power supply is also obtained and used to supply power to the in-vehicle low-voltage battery 36.

Figure 5:
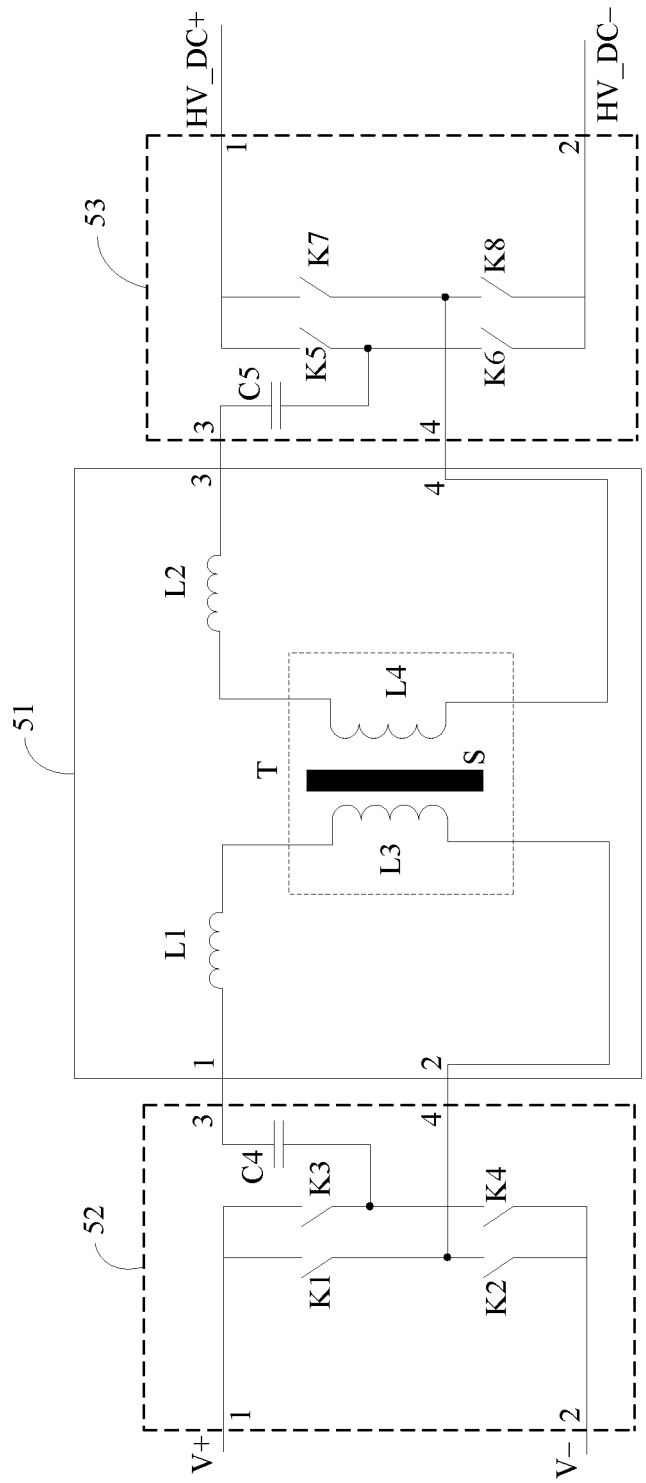
FIG. 5 is a schematic structural diagram of a two-way DC converter circuit according to an embodiment of this application.

As shown in FIG. 5, when the OBC circuit system is the OBC two-way circuit system as shown in FIG. 3, the two-way DC converter circuit 33 includes a magnetic apparatus 51, a primary side resonant switch circuit 52, and a secondary side resonant switch circuit 53.

In general, in a one-way DC converter circuit, a primary side refers to an input side of a voltage, and a secondary side refers to an output side of a converted voltage. For the two-way DC converter circuit in this embodiment of this application, the primary side is a side connected to the PFC 32 in FIG. 3 or FIG. 4, and the secondary side is a side connected to the in-vehicle high-voltage traction battery 34 in FIG. 3 or FIG. 4.

The primary side resonant switch circuit 52 includes a first switch K1, a second switch K2, a third switch K3, a fourth switch K4, and a primary side resonant capacitor C4. A first terminal of the primary side resonant switch circuit 52 serves as the first terminal of the two-way DC converter circuit 33, and is connected to a first terminal of the first switch K1 and a first terminal of the third switch K3. A second terminal of the primary side resonant switch circuit 52 serves as the first terminal of the two-way DC converter circuit 33, and is connected to a second terminal of the second switch K2 and a second terminal of the fourth switch K4. A second terminal of the first switch K1 is connected to a first terminal of the second switch K2, and the second terminal of the first switch K1 serves as a fourth terminal of the primary side resonant switch circuit 52 and is connected to a second terminal of the magnetic apparatus 51. A second terminal of the third switch K3 is connected to a first terminal of the fourth switch K4 and a first terminal of the primary side resonant capacitor C4. A second terminal of the primary side resonant capacitor C4 serves as a third terminal of the primary side resonant switch circuit 52 and is connected to a first terminal of the magnetic apparatus 51.

The secondary side resonant switch circuit 53 includes a fifth switch K5, a sixth switch K6, a seventh switch K7, an eighth switch K8, and a secondary side resonant capacitor C5. A first terminal of the secondary side resonant switch circuit 53 serves as the third terminal of the two-way DC converter circuit 33, and is connected to a first terminal of the fifth switch K5 and a first terminal of the seventh switch K7. A second terminal of the secondary side resonant switch circuit 53 serves as the fourth terminal of the two-way DC converter circuit 33, and is connected to a second terminal of the sixth switch K6 and a second terminal of the eighth switch K8. A second terminal of the seventh switch K7 is connected to a first terminal of the eighth switch K8, and the second terminal of the seventh switch K7 serves as a fourth terminal of the primary side resonant switch circuit 53 and is connected to a fourth terminal of the magnetic apparatus 51. A second terminal of the fifth switch K5 is connected to a first terminal of the sixth switch K6 and a first terminal of the secondary side resonant capacitor C5. A second terminal of the secondary side resonant capacitor C5 serves as a third terminal of the secondary side resonant switch circuit 53 and is connected to a third terminal of the magnetic apparatus 51.

The first terminal of the primary side resonant switch circuit 52 is configured to connect to the first terminal of the PFC circuit 32, and the second terminal of the primary side resonant switch circuit 52 is configured to connect to the second terminal of the PFC circuit 32.

The magnetic apparatus 51 includes a primary side resonant inductor L1, a secondary side resonant inductor L2, and a transformer T. The transformer T includes a primary side coil L3, a first secondary side coil L4, and a magnetic core S.

A first terminal of the primary side resonant inductor L1 serves as the first terminal of the magnetic apparatus 51 and is connected to the third terminal of the primary side resonant switch circuit 52, a second terminal of the primary side resonant inductor L1 is connected to a first terminal of the primary side coil L3, and a second terminal of the primary side coil L3 serves as the second terminal of the magnetic apparatus 51 and is connected to the fourth terminal of the primary side resonant switch circuit 52. A first terminal of the secondary side resonant inductor L2 serves as the third terminal of the magnetic apparatus 51 and is connected to the third terminal of the secondary side resonant switch circuit 52, a second terminal of the secondary side resonant inductor L2 is connected to a first terminal of the first secondary side coil L4, and a second terminal of the first secondary side coil L4 serves as the fourth terminal of the magnetic apparatus 51 and is connected to the fourth terminal of the secondary side resonant switch circuit 53. The primary side coil L3 and the first secondary side coil L4 are wound on the magnetic core S.

Figure 6:
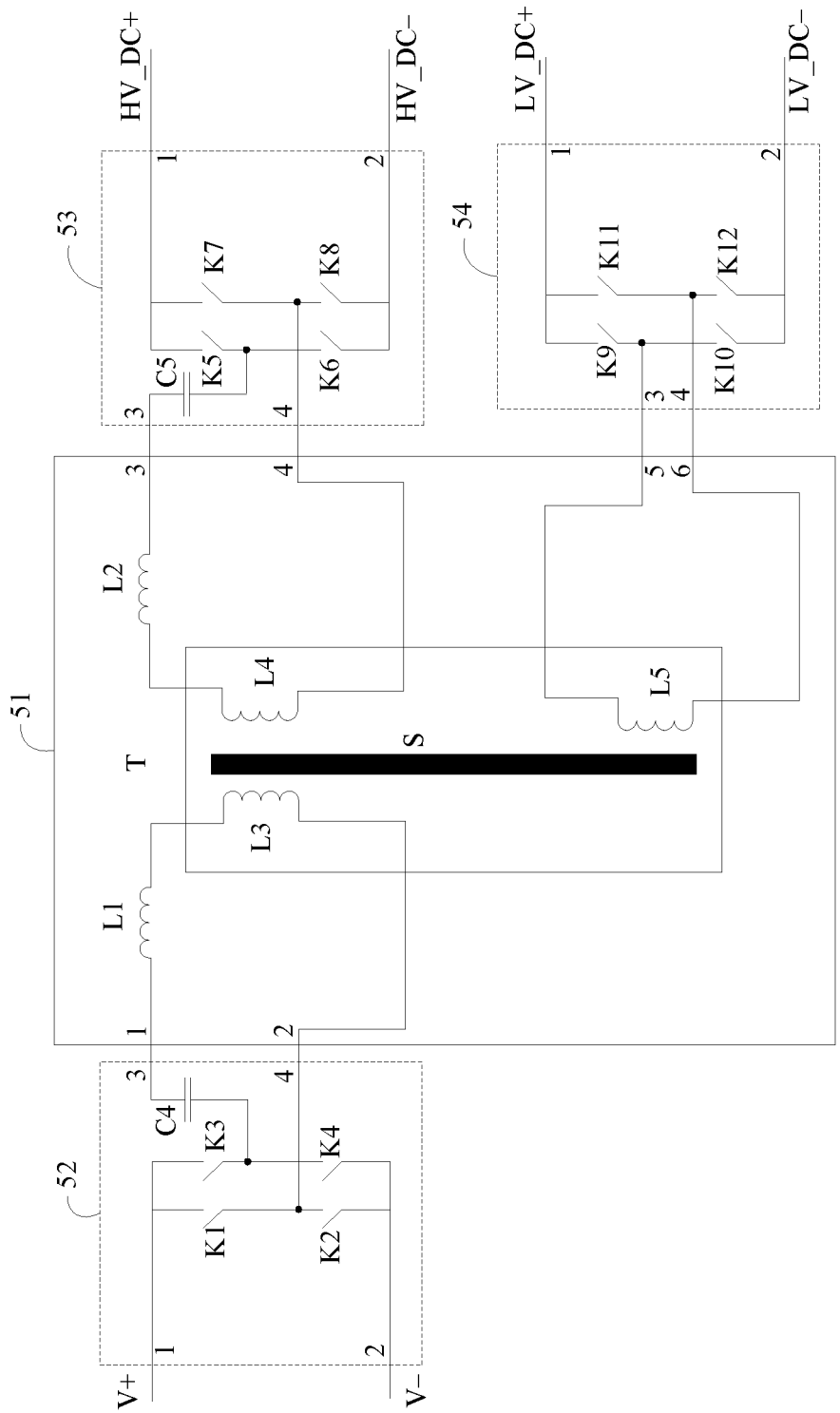
FIG. 6 is a schematic structural diagram of another two-way DC converter circuit according to an embodiment of this application.

Optionally, as shown in FIG. 6, when the OBC circuit system is the OBC three-way circuit system as shown in FIG. 4, the two-way DC converter circuit 33 may further include a secondary side switch circuit 54. The transformer T of the magnetic apparatus 51 may further include a second secondary side coil L5.

The secondary side switch circuit 54 includes a ninth switch K9, a tenth switch K10, an eleventh switch K11, and a twelfth switch K12. A first terminal of the secondary side switch circuit 54 serves as the fifth terminal of the two-way DC converter circuit 33, and is connected to a first terminal of the ninth switch K9 and a first terminal of the eleventh switch K11. A second terminal of the secondary side switch circuit 54 serves as the sixth terminal of the two-way DC converter circuit 33, and is connected to a second terminal of the tenth switch K10 and a second terminal of the twelfth switch K12. A second terminal of the ninth switch K9 is connected to a first terminal of the tenth switch K10, and serves as a third terminal of the secondary side switch circuit 54 to connect to a fifth terminal of the magnetic apparatus 51. A second terminal of the eleventh switch K11 is connected to a first terminal of the twelfth switch K12, and serves as a fourth terminal of the secondary side switch circuit 54 to connect to a sixth terminal of the magnetic apparatus 51.

The second secondary side coil L5 is wound on the magnetic core S, and a first terminal of the second secondary side coil L5 serves as the fifth terminal of the magnetic apparatus 51 to connect to the third terminal of the secondary side switch circuit 54. A second terminal of the second secondary side coil L5 serves as the sixth terminal of the magnetic apparatus 51 and is connected to the fourth terminal of the secondary side switch circuit 54.

A specific structure of the magnetic apparatus 51 is described in detail below.

As shown in FIG. 7 to FIG. 11, an embodiment of this application provides a magnetic apparatus, including a first magnetic member 71, a second magnetic member 72, a first winding 73, and a second winding 74. The first magnetic member 71 includes a first magnetic cylinder 711, a second magnetic cylinder 712, a third magnetic cylinder 713, and at least one fourth magnetic cylinder 714.

In FIG. 7 to FIG. 11, A is a schematic diagram showing how the first winding 73 and the second winding 74 are wound, B is a schematic structural diagram of the first magnetic member 71, C is a schematic structural diagram of the magnetic apparatus when the second magnetic member 72 is a magnetic member without a magnetic cylinder, and D is a schematic structural diagram of the magnetic apparatus when the second magnetic member 72 is a magnetic member with a magnetic cylinder.

The first winding 73 is wound around the first magnetic cylinder 711 and the second magnetic cylinder 712, and the second winding 74 is wound around the first magnetic cylinder 711 and the third magnetic cylinder 713.

A direction in which the first winding 73 is wound around the first magnetic cylinder 711 and a direction in which the second winding 74 is wound around the first magnetic cylinder 711 may be the same or opposite. When the winding directions are the same, an in-phase end of a primary side and an in-phase end of a secondary side of the transformer are opposite, and when the winding directions are opposite, the in-phase end of the primary side and the in-phase end of the secondary side of the transformer are the same.

A direction in which the first winding 73 is wound around the second magnetic cylinder 712 is opposite to a direction in which the second winding 74 is wound around the third magnetic cylinder 713. For example, the direction in which the first winding 73 is wound around the second magnetic cylinder 712 is clockwise, and the direction in which the second winding 74 is wound around the third magnetic cylinder 713 is counterclockwise. Alternatively, the direction in which the first winding 73 is wound around the second magnetic cylinder 712 is counterclockwise, and the direction in which the second winding 74 is wound around the third magnetic cylinder 713 is clockwise.

The first magnetic member 71 and the second magnetic member 72 form a magnetic circuit of the transformer T shown in FIG. 5 or FIG. 6 through the first magnetic cylinder 711 and the fourth magnetic cylinder 714. In this case, the first magnetic cylinder 711 is a magnetic core S of the transformer T, a part of the first winding 73 around the first magnetic cylinder 711 forms a primary side coil L3, and a part of the second winding 74 around the first magnetic cylinder 711 forms a first secondary side coil L4.

Figure 7:
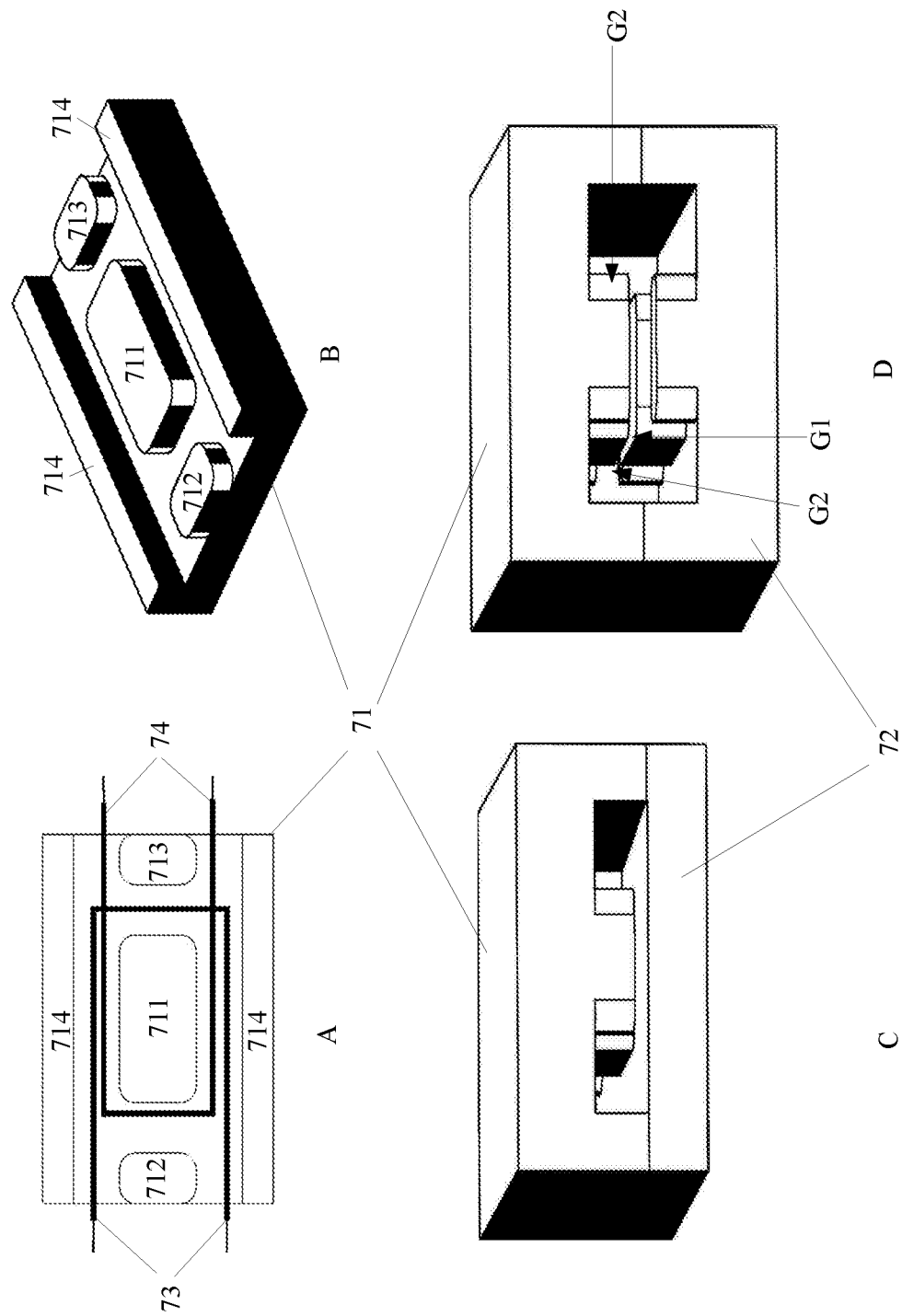
FIG. 7 is a schematic structural diagram of a magnetic apparatus according to an embodiment of this application.
Figure 12:
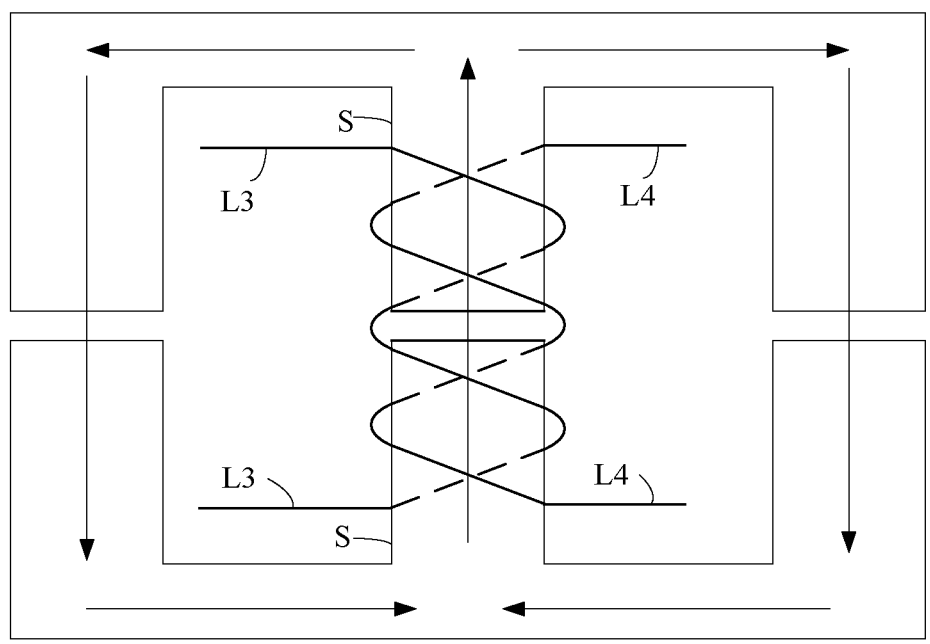
FIG. 12 is a schematic diagram of a magnetic circuit according to an embodiment of this application.

The magnetic circuit in this embodiment of this application refers to a closed path through which magnetic flux passes. The magnetic apparatus in D of FIG. 7 is used as an example for description. As shown in FIG. 12, a closed path formed by arrows in the figure is the magnetic circuit. The primary side coil L3 converts electrical energy into magnetic energy of a magnetic circuit of the magnetic core S. The first secondary side coil L4 then converts the magnetic energy into electrical energy.

A part of the first winding 73 around the second magnetic cylinder 712 forms a primary side resonant inductor L1. A part of the second winding 74 around the third magnetic cylinder 713 forms a secondary side resonant inductor L2. The direction in which the first winding 73 is wound around the second magnetic cylinder 712 is opposite to the direction in which the second winding 74 is wound around the third magnetic cylinder 713, and therefore in the magnetic circuit, a direction of magnetic flux generated by the primary side resonant inductor L1 is opposite to a direction of magnetic flux generated by the secondary side resonant inductor L2.

The second magnetic member 72 may be a magnetic member without a magnetic cylinder as shown in C in FIG. 7 to FIG. 11, or a magnetic member with a magnetic cylinder as shown in D in FIG. 7 to FIG. 11.

When the second magnetic member 72 is a magnetic member without a magnetic cylinder, a surface of the second magnetic member 72 is coupled to all the magnetic cylinders of the first magnetic member 71. When the second magnetic member 72 is a magnetic member with a magnetic cylinder, the second magnetic member 72 also has a magnetic cylinder at a same position in which a magnetic cylinder of the first magnetic member 71 is located, and at the same position, the magnetic cylinder of the second magnetic member 72 is placed opposite to and coupled to the magnetic cylinder of the first magnetic member 71. In particular, the second magnetic member 72 may be a magnetic member the same as the first magnetic member 71. It should be noted that in this application, the second magnetic member 72 being the same as the first magnetic member 71 is used as an example for description, but this application is not intended to be limited thereto.

In this embodiment of this application, a width of an air gap between the second magnetic cylinder 712 of the first magnetic member 71 and (a second magnetic cylinder of) the second magnetic member 72 is a width of an air gap of the primary side resonant inductor L1, a width of an air gap between the third magnetic cylinder 713 of the first magnetic member 71 and (a third magnetic cylinder) of the second magnetic member 72 is a width of an air gap of the secondary side resonant inductor L2, and a width of an air gap between the first magnetic cylinder 711 of the first magnetic member 71 and (a first magnetic cylinder of) of the second magnetic member 72 is a width of an air gap of the transformer T.

The width of the air gap of the primary side resonant inductor L1 can be the same as the width of the air gap of the secondary side resonant inductor L2 (for example, both widths are G2) or different. In this application, the widths being the same are used as an example, but this application is not intended to be limited thereto. The width of the air gap G2 of the resonant inductor (including the primary side resonant inductor L1 and the secondary side resonant inductor L2) is greater than or equal to the width of the air gap G1 of the transformer T, and the width of the air gap G1 of the transformer T is greater than zero. By adjusting the widths of the foregoing air gaps, magnetic resistance of the magnetic circuit (a magnetic specification of the magnetic circuit) may be adjusted to implement an optimal working state of the circuit. In an example, in FIG. 7, the width of the air gap G2 is 1.0 millimeters (mm), and the width of the air gap G1 is 0.2 mm. In FIG. 8, FIG. 9, FIG. 10, and FIG. 11, the width of the air gap G2 is 0.5 mm, and the width of the air gap G1 is 0.1 mm.

Figure 8:
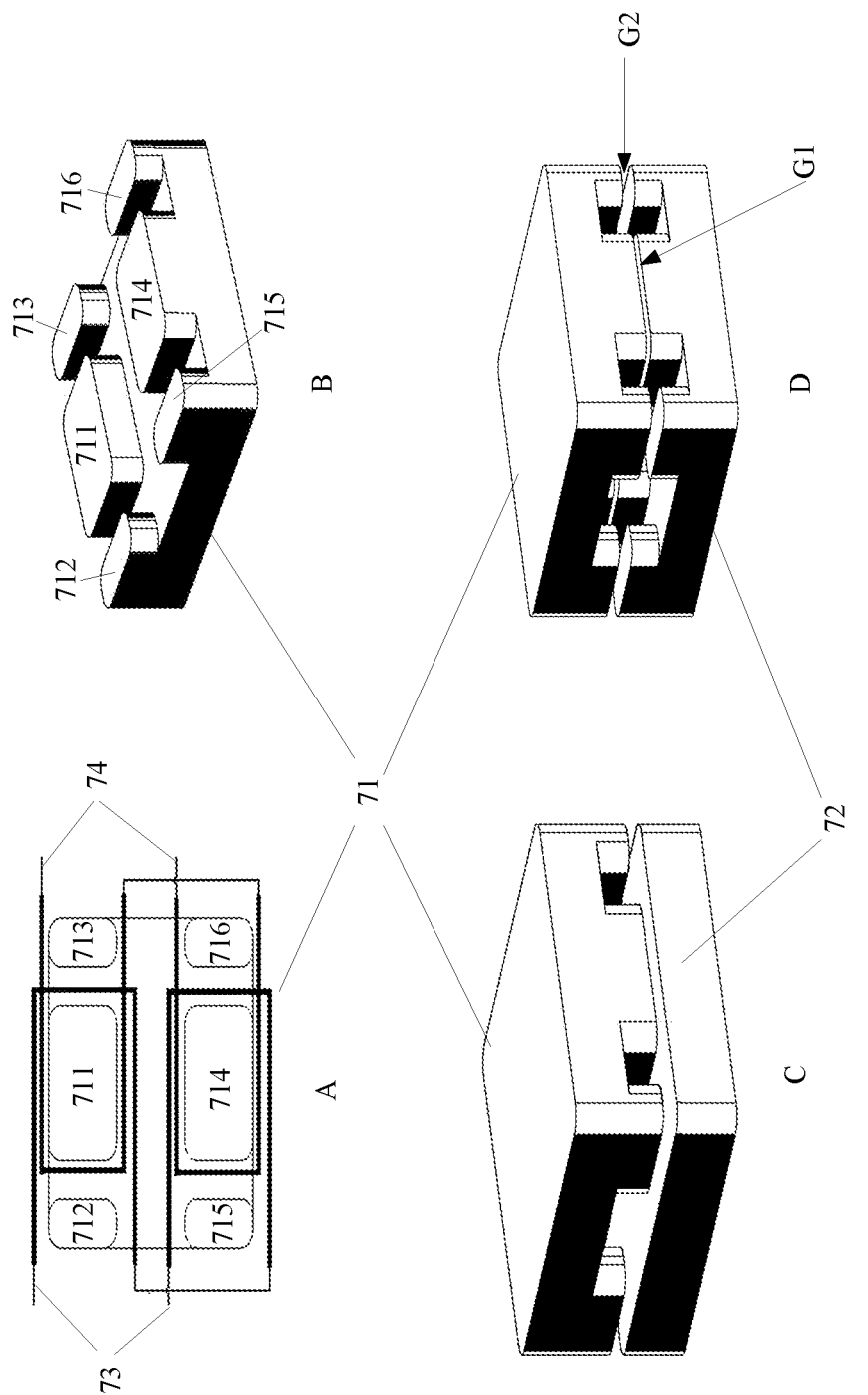
FIG. 8 is a schematic structural diagram of a magnetic apparatus according to an embodiment of this application.
Figure 9:
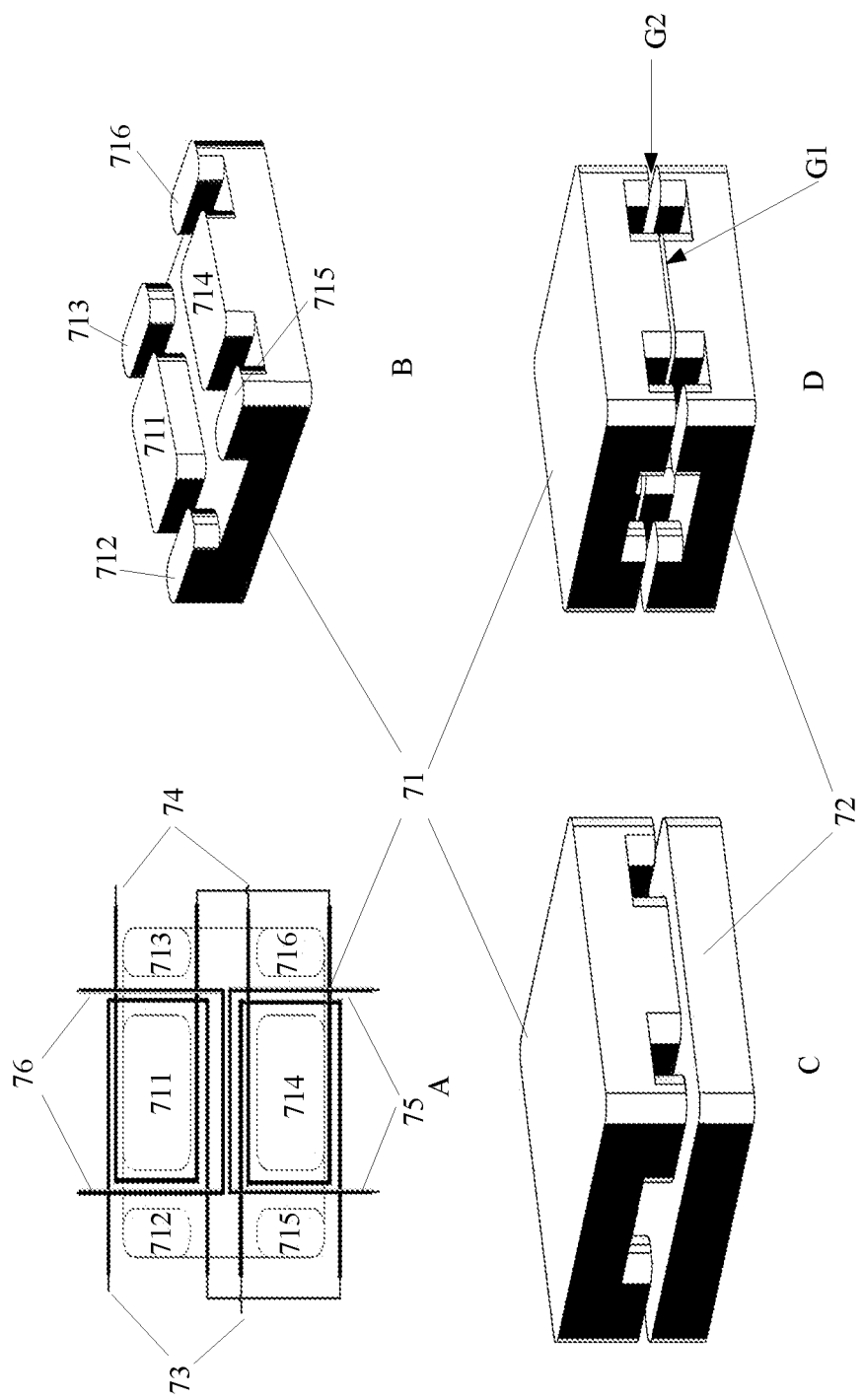
FIG. 9 is a schematic structural diagram of a magnetic apparatus according to an embodiment of this application.

Optionally, as shown in FIG. 8 and FIG. 9, the first magnetic member 71 further includes a fifth magnetic cylinder 715 and a sixth magnetic cylinder 716.

The first winding 73 is also wound around the fourth magnetic cylinder 714 and the fifth magnetic cylinder 715. A direction in which the first winding 73 is wound around the fifth magnetic cylinder 715 is opposite to the direction in which the first winding 73 is wound around the second magnetic cylinder 712, and a direction in which the first winding 73 is wound around the fourth magnetic cylinder 714 is the opposite to the direction in which the first winding 73 is wound around the first magnetic cylinder 711.

The second winding 74 is also wound around the fourth magnetic cylinder 714 and the sixth magnetic cylinder 716. A direction in which the second winding 74 is wound around the sixth magnetic cylinder 716 is opposite to the direction in which the second winding 74 is wound around the third magnetic cylinder 713, and a direction in which the second winding 74 is wound around the fourth magnetic cylinder 714 is the opposite to the direction in which the second winding 74 is wound around the first magnetic cylinder 711.

In this case, both the first magnetic cylinder 711 and the fourth magnetic cylinder 714 are the magnetic cores S of the transformer T. Parts of the first winding 73 around the first magnetic cylinder 711 and around the fourth magnetic cylinder 714 are connected in series to form the primary side coil L3, and parts of the second winding 74 around the first magnetic cylinder 711 and around the fourth magnetic cylinder 714 are connected in series to form the first secondary side coil L4. Parts of the first winding 73 around the second magnetic cylinder 712 and around the fifth magnetic cylinder 715 are connected in series to form a primary side resonant inductor L1, and the primary side resonant inductor L1 may be connected to the primary side resonant switch circuit 52. Parts of the second winding 74 around the third magnetic cylinder 713 and around the sixth magnetic cylinder 716 are connected in series to form a secondary side resonant inductor L2, and the secondary side resonant inductor L2 may be connected to the secondary side resonant switch circuit 53.

A width of an air gap between the fourth magnetic cylinder 714 and the second magnetic member 72 and the width of the air gap between the first magnetic cylinder 711 and the second magnetic member 72 may be the same or different, and the two widths may be collectively referred to as the width of the air gap of the transformer T.

The width of the air gap of the primary side resonant inductor L1, that is, the width of the air gap between the second magnetic cylinder 712, and the second magnetic member 72 and the width of the air gap between the fifth magnetic cylinder 715 and the second magnetic member 72 may be the same, the width of the air gap of the side resonant inductor L2, that is, a width of the air gap between the third magnetic cylinder 713 and the second magnetic member 72, and a width of the air gap between the sixth magnetic cylinder 716 and the second magnetic member 72 may be the same, and the width of the air gap of the primary side resonant inductor L1 and the width of the air gap of the secondary side resonant inductor L2 may be the same or different. The width of the air gap of the primary side resonant inductor L1 and the width of the air gap of the secondary side resonant inductor L2 may be collectively referred to as the width of the air gap of the resonant inductor.

Optionally, as shown in FIG. 9, the magnetic apparatus further includes at least one third winding 75, and the third winding 75 is wound around the fourth magnetic cylinder 714. A part of the third winding 75 around the fourth magnetic cylinder 714 forms a second secondary side coil L5, that is, one-side output of the second secondary side coil L5 is implemented.

Compared with FIG. 7, the magnetic core in FIG. 8 and FIG. 9 is changed from an E-shaped center winding to a U-shaped two-side cylinder co-winding. This provides larger winding space, so that power devices are distributed on both sides of the magnetic core, thereby conducive to better heat balance.

Figure 10:
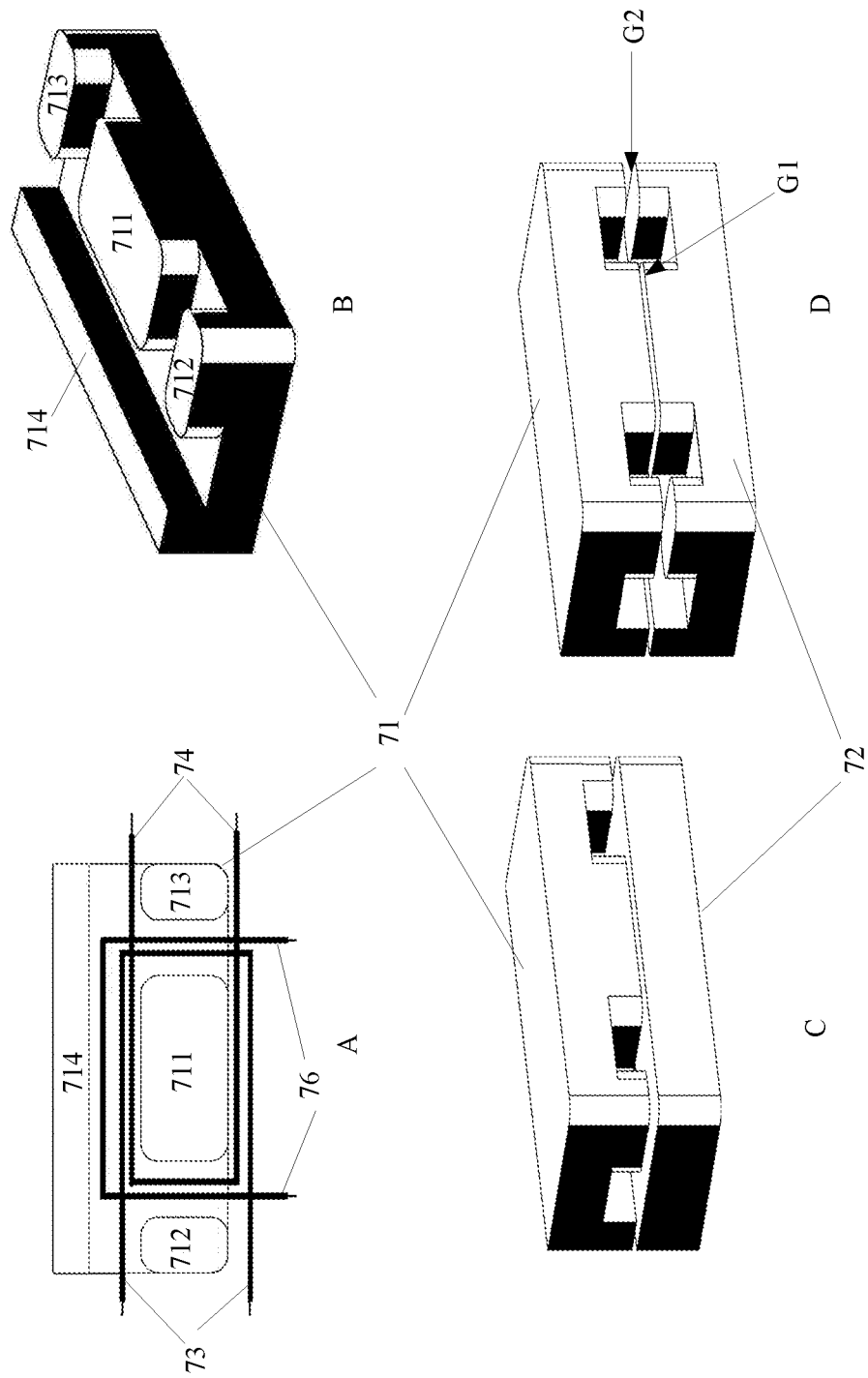
FIG. 10 is a schematic structural diagram of a magnetic apparatus according to an embodiment of this application.
Figure 11:
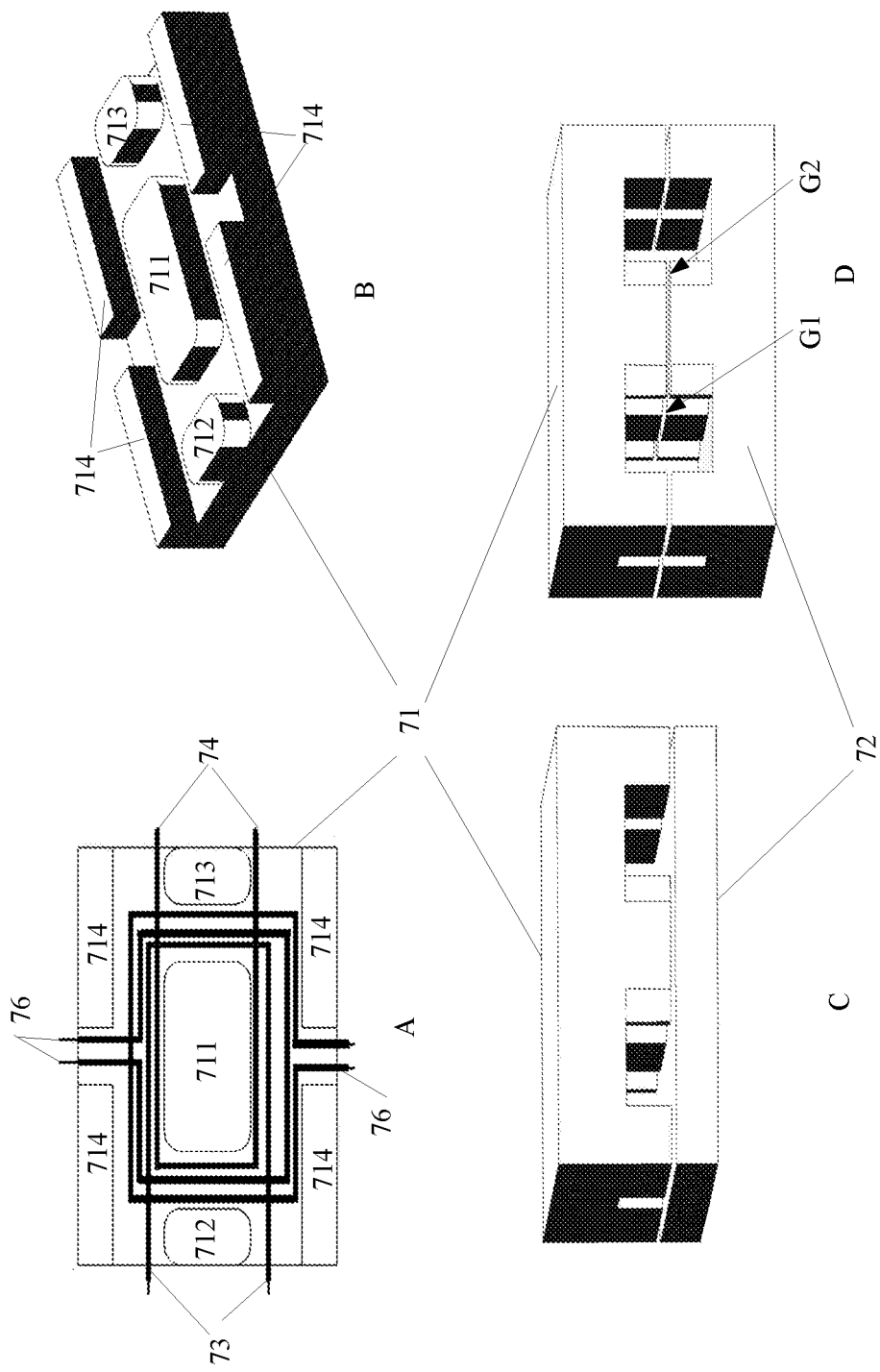
FIG. 11 is a schematic structural diagram of a magnetic apparatus according to an embodiment of this application.

Optionally, as shown in FIG. 9 to FIG. 11, the magnetic apparatus further includes at least one fourth winding 76, and the fourth winding 76 is wound around the first magnetic cylinder 711. A part of the fourth winding 76 around the first magnetic cylinder 711 forms a second secondary side coil L5.

The secondary side coil L5 formed by the third winding 75 and the second secondary side coil L5 formed by the fourth winding 76 may be connected in parallel to the secondary side switch circuit 54. That is, two-side output of the second secondary side coil L5 is implemented. The second secondary side coil L5 formed by a plurality of fourth windings 76 or a plurality of third windings 75 may also be connected in parallel to the secondary side switch circuit 54.

Compared with FIG. 7, a set of output windings in FIG. 10 is added as the second secondary side coil L5 to implement a multi-functional integrated magnetic design.

Compared with the one-side output of the second secondary side coil L5 in FIG. 10, the two-side output of the second secondary side coil L5 in FIG. 9 and FIG. 11 is implemented, increasing low-voltage current output capability, and reducing losses.

In this embodiment of this application, a quantity of turns of each winding is greater than or equal to 1. In the figures, one turn is used as an example for description, but this application is not intended to be limited thereto.

For example, in FIG. 7, FIG. 10, and FIG. 11, the first winding 73 has 20 turns around the first magnetic cylinder 711 and the second magnetic cylinder 712, that is, a quantity of turns of the primary side resonant inductor L1 and the primary side coil L3 of the transformer T is 20. The second winding 74 has 16 turns around the first magnetic cylinder 711 and the third magnetic cylinder 713, that is, a quantity of turns of the secondary side resonant inductor L2 and the secondary side coil L4 of the transformer T is 16

For example, in FIG. 8 and FIG. 9, the first winding 73 has 10 turns around the first magnetic cylinder 711 and the second magnetic cylinder 712, and the first winding 73 has 10 turns around the fourth magnetic cylinder 714 and the second magnetic cylinder 712, that is, a quantity of turns of the primary side resonant inductor L1 and the primary side coil L3 of the transformer T is 20. The second winding 74 has 8 turns around the first magnetic cylinder 711 and the third magnetic cylinder 713, and the second winding 74 has 8 turns around the fourth magnetic cylinder 714 and the sixth magnetic cylinder 716, that is, a sum of a quantity of turns of the secondary side resonant inductor L2 and a quantity of turns of the secondary side coil L4 of the transformer T is 16.

Based on the magnetic apparatus and the two-way DC converter circuit provided in the embodiments of this application, the primary side coil (that is, the part of the first winding around the first magnetic cylinder) of the transformer of the two-way DC converter circuit is connected to the primary side resonant inductor (that is, the part of the first winding around the second magnetic cylinder) in series (in a form of the first winding), and the first secondary side coil (that is, the part of the first winding around the first magnetic cylinder) of the transformer and the secondary side resonant inductor (that is, the part of the second winding around the third magnetic cylinder) are connected in series (in a form of the second winding), thereby resolving the problem of high losses in the other approaches due to no electrical connection between the windings and therefore no interleaving cancellation effect, and reducing losses of the winding in the magnetic apparatus. A winding path can be reduced by more than 30%, and winding losses can be reduced by more than 30%. In addition, relatively discrete magnetic members are used, and the resonant inductor and the transformer are integrated, and therefore a quantity of magnetic members and a quantity of assembly procedures are reduced.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A magnetic apparatus comprising:
   a first magnetic member comprising:
   a first magnetic cylinder;
   a second magnetic cylinder;
   a third magnetic cylinder; and
   a fourth magnetic cylinder;
   a first winding that is wound around the first magnetic cylinder and the second magnetic cylinder, wherein a first part of the first winding that is wound around the second magnetic cylinder forms a primary side resonant inductor, and wherein the first winding is wound around the second magnetic cylinder in a first direction;
   a second winding that is wound around the first magnetic cylinder and the third magnetic cylinder, wherein a second part of the second winding that is wound around the third magnetic cylinder forms a secondary side resonant inductor, and wherein the second winding is wound around the third magnetic cylinder in a second direction that is opposite to the first direction; and a second magnetic member configured to form, with the first magnetic member, a magnetic circuit of a transformer through the first magnetic cylinder and the fourth magnetic cylinder.

2. The magnetic apparatus of claim 1, wherein the second magnetic member does not comprise a magnetic cylinder and comprises a surface coupled to the first magnetic cylinder, the second magnetic cylinder, the third magnetic cylinder, and the fourth magnetic cylinder.

3. The magnetic apparatus of claim 1, wherein the first magnetic member further comprises a sixth magnetic cylinder, wherein the second magnetic member comprises a fifth magnetic cylinder, and wherein the fifth magnetic cylinder is disposed opposite to and coupled to the sixth magnetic cylinder at a same position.

4. The magnetic apparatus claim 3, wherein the first magnetic member further comprises:
   a seventh magnetic cylinder; and
   an eighth magnetic cylinder,
   wherein the first winding is further wound around the fourth magnetic cylinder and the seventh magnetic cylinder, wherein the first winding is wound around the seventh magnetic cylinder in the second direction, wherein the first winding is wound around the fourth magnetic cylinder in the second direction, wherein the first winding is wound around the first magnetic cylinder in the first direction, and wherein a third part of the first winding that is wound around the seventh magnetic cylinder further forms the primary side resonant inductor,
   wherein the second winding is further wound around the fourth magnetic cylinder and the eighth magnetic cylinder, wherein the second winding is wound around the eighth magnetic cylinder in the first direction, wherein the second winding is wound around the fourth magnetic cylinder in the first direction, wherein the second winding is wound around the first magnetic cylinder in the second direction, and wherein a fourth part of the second winding that is wound around the eighth magnetic cylinder further forms the secondary side resonant inductor.

5. The magnetic apparatus of claim 4, wherein a first width of a first air gap between the fourth magnetic cylinder and the second magnetic member is equal to a second width of a second air gap between the first magnetic cylinder and the second magnetic member.

6. The magnetic apparatus of claim 4, wherein a first width of a first air gap between the second magnetic cylinder and the second magnetic member is equal to a second width of a second air gap between the seventh magnetic cylinder and the second magnetic member, and wherein a third width of a third air gap between the third magnetic cylinder and the second magnetic member is equal to a fourth width of a fourth air gap between the eighth magnetic cylinder and the second magnetic member.

7. The magnetic apparatus claim 4, further comprising a third winding that is wound around the fourth magnetic cylinder, wherein a fifth part of the third winding that is wound around the fourth magnetic cylinder forms a secondary side coil.

8. The magnetic apparatus claim 1, further comprising a fourth winding that is wound around the first magnetic cylinder, wherein a third part of the fourth winding that is wound around the first magnetic cylinder forms a secondary side coil.

9. The magnetic apparatus claim 1, wherein a first width of a first air gap between the second magnetic cylinder and the second magnetic member and a second width of a second air gap between the third magnetic cylinder and the second magnetic member are greater than or equal to a third width of a third air gap between the first magnetic cylinder and the second magnetic member, and wherein the third width is greater than zero.

10. A two-way direct current (DC) converter circuit comprising:
   a magnetic apparatus comprising:
      a first magnetic member comprising:
         a first magnetic cylinder;
         a second magnetic cylinder;
         a third magnetic cylinder; and
         a fourth magnetic cylinder;
      a first winding that is wound around the first magnetic cylinder and the second magnetic cylinder, wherein a first part of the first winding that is wound around the second magnetic cylinder forms a primary side resonant inductor, and wherein the first winding is wound around the second magnetic cylinder in a first direction;
      a second winding that is wound around the first magnetic cylinder and the third magnetic cylinder, wherein a second part of the second winding that is wound around the third magnetic cylinder forms a secondary side resonant inductor, and wherein the second winding is wound around the third magnetic cylinder in a second direction that is opposite to the first direction; and
      a second magnetic member configured to form, with the first magnetic member, a magnetic circuit of a transformer through the first magnetic cylinder and the fourth magnetic cylinder;
   a primary side resonant switch circuit coupled to the primary side resonant inductor; and
   a secondary side resonant switch circuit coupled to the secondary side resonant inductor.

11. The two-way DC converter circuit of claim 10, further comprising a secondary side switch circuit coupled to a secondary side coil of the magnetic apparatus.

12. The two-way DC converter circuit of claim 10, wherein the second magnetic member does not comprise a magnetic cylinder and comprises a surface coupled to the first magnetic cylinder, the second magnetic cylinder, the third magnetic cylinder, and the fourth magnetic cylinder.

13. The two-way DC converter circuit of claim 10, wherein the first magnetic member further comprises a sixth magnetic cylinder, wherein the second magnetic member comprises a fifth magnetic cylinder, and wherein the fifth magnetic cylinder is placed opposite to and coupled to the sixth magnetic cylinder at a same position.

14. The two-way DC converter circuit of claim 13, wherein the first magnetic member further comprises:
   a seventh magnetic cylinder; and
   an eighth magnetic cylinder,
   wherein the first winding is further wound around the fourth magnetic cylinder and the seventh magnetic cylinder, wherein the first winding is wound around the seventh magnetic cylinder in the second direction, wherein the first winding is wound around the fourth magnetic cylinder in the second direction, wherein the first winding is wound around the first magnetic cylinder in the first direction, and wherein a third part of the first winding that is wound around the seventh magnetic cylinder further forms the primary side resonant inductor.

15. The two-way DC converter circuit of claim 14, wherein the second winding is further wound around the fourth magnetic cylinder and the eighth magnetic cylinder, wherein the second winding is wound around the eighth magnetic cylinder in the first direction, wherein the second winding is wound around the fourth magnetic cylinder in the first direction, wherein the second winding is wound around the first magnetic cylinder in the second direction, and wherein a fourth part of the second winding that is wound around the eighth magnetic cylinder further forms the secondary side resonant inductor.

16. The two-way DC converter circuit of claim 15, wherein a first width of a first air gap between the fourth magnetic cylinder and the second magnetic member is equal to a second width of a second air gap between the first magnetic cylinder and the second magnetic member.

17. The two-way DC converter circuit of claim 15, wherein a first width of a first air gap between the second magnetic cylinder and the second magnetic member is equal to a second width of a second air gap between the seventh magnetic cylinder and the second magnetic member, and wherein a third width of a third air gap between the third magnetic cylinder and the second magnetic member is equal to a fourth width of a fourth air gap between the eighth magnetic cylinder and the second magnetic member.

18. The two-way DC converter circuit of claim 15, wherein the magnetic apparatus further comprises a third winding that is wound around the fourth magnetic cylinder, and wherein a fifth part of the third winding that is wound around the fourth magnetic cylinder forms a secondary side coil.

19. The two-way DC converter circuit of claim 10, wherein the magnetic apparatus further comprises a fourth winding that is wound around the first magnetic cylinder, and wherein a third part of the fourth winding that is wound around the first magnetic cylinder forms a secondary side coil.

20. The two-way DC converter circuit of claim 10, wherein a first width of a first air gap between the second magnetic cylinder and the second magnetic member and a second width of a second air gap between the third magnetic cylinder and the second magnetic member are greater than or equal to a third width of a third air gap between the first magnetic cylinder and the second magnetic member, and wherein the third width is greater than zero.

* * * * *